United States Patent [19]

Bosshard

[11] 4,048,504

[45] Sept. 13, 1977

[54] METHOD AND APPARATUS FOR TREATING FLOWABLE MATERIAL

[75] Inventor: Ernst Bosshard, Winterthur, Switzerland

[73] Assignee: Sulzer Brothers Limited, Winterthur, Switzerland

[21] Appl. No.: 552,982

[22] Filed: Feb. 25, 1975

[30] Foreign Application Priority Data

Dec. 23, 1974 Switzerland .................. 17237/74

[51] Int. Cl.² ......................................... G01N 23/12
[52] U.S. Cl. .................. 250/434; 250/432 R; 250/492 B
[58] Field of Search ............... 250/492, 492 B, 398, 250/432, 433, 434

[56] References Cited

U.S. PATENT DOCUMENTS

| | | | |
|---|---|---|---|
| 1,068,898 | 7/1913 | Henri et al. ................... | 250/433 |
| 1,817,936 | 8/1931 | Supplee ........................ | 250/434 |
| 2,858,442 | 10/1958 | Dewey .......................... | 250/492 B |
| 2,907,704 | 10/1959 | Trump .......................... | 250/492 B |
| 3,081,485 | 3/1963 | Steigerwald ................... | 250/492 B |
| 3,501,390 | 3/1970 | Turner ......................... | 250/492 B |
| 3,501,391 | 3/1970 | Smith et al. .................. | 250/492 B |
| 3,655,965 | 4/1972 | Icre et al. ................... | 250/492 B |
| 3,891,855 | 6/1975 | Offermann ...................... | 250/492 B |
| 3,933,434 | 1/1976 | Matovich ....................... | 250/432 R |

*Primary Examiner*—Alfred E. Smith
*Assistant Examiner*—B. C. Anderson
*Attorney, Agent, or Firm*—Kenyon & Kenyon, Reilly, Carr & Chapin

[57] ABSTRACT

The flowable material is directed through an irradiation zone in a thin layer and in a free fall. In one embodiment, the material is accelerated by one or more rollers prior to entry into the irradiation zone. The thin layer may be directed vertically or horizontally past one or more electron beams.

3 Claims, 3 Drawing Figures

METHOD AND APPARATUS FOR TREATING FLOWABLE MATERIAL

This invention relates to a method and apparatus for treating flowable material by means of electron beams.

Proposals for treating flowable material by means of electron beams have been known. In some cases, the proposals require spreading out of the material in the form of a thin layer by means of and on the circumference of a rotating drum and the directing of radiation onto the material in the radial direction of the drum. If the throughput required increases, then either the drum speed or diameter must be increased. However, the radial acceleration of the material must not exceed the acceleration of free fall in these conditions, since otherwise the material will be hurled off the drum. Generally, it is possible to make the drum length longer but this entails a large reciprocating amplitude of the electron beam so that a uniform irradiation of the material is no longer certain. Also, a long drum requires more space and necessitates constructional details to compensate for sag.

Accordingly, it is an object of the invention to provide a method of the above kind in which large throughputs can be handled without the need for a much longer drum.

It is another object of the invention to provide a simple apparatus for treating flowable material in an irradiation zone.

Briefly, the invention provides a method in which the material to be treated is passed through an irradiation zone in the form of a thin layer in free fall. The term "free fall" means that a body is completely free to move in a gravitational field, which strictly speaking, is only possible in a vacuum. In accordance with the method, the material is also accelerated before passage into the irradiation zone.

The invention also provides an apparatus for treating flowable material in accordance with the above method. This apparatus includes a first means for forming an irradiation zone and a second means for directing the material through the irradiation zone in a thin layer. This second means includes at least one rotating roller for accelerating the thin layer of material prior to passage into the irradiation zone.

The material may also be accelerated by a pair of counter-rotating rollers, the circumferential speed of which is such that the radial acceleration of the material is greater than acceleration due to gravity.

These and other objects and advantages of the invention will become more apparent from the following detailed description and appended claims taken in conjunction with the accompanying drawings in which:

Figure 1:
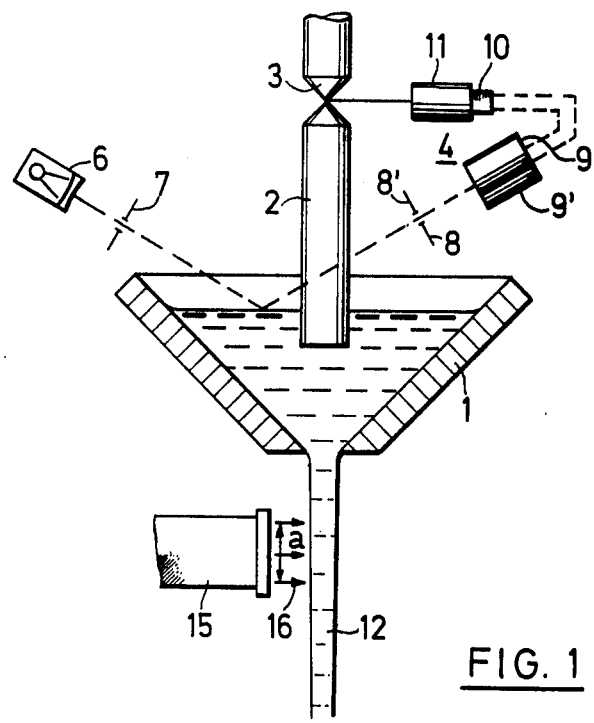
FIG. 1 illustrates an apparatus for performing the method according to the invention.

Referring to FIG. 1, an apparatus for treating flowable material includes a long hopper 1 which is square in plan view and into which leads a feed pipe 2 with a valve 3 for the material for irradiation. The level of material in the hopper 1 is kept at a constant value by means of a level controller 4, which controls the valve 3. The level controller 4 comprises a light source 6 with a slit diaphragm 7, two ordinary apertures 8, 8' laterally offset from one another, and two photoelectric cells 9, 9'. The outputs of the cells 9, 9' are taken to a control element 10 of a servomotor 11. If the level of material in the hopper is too low, the photoelectric cell 9' receives more light from the light source 6 via the aperture 8' than the photoelectric cell 9, so that the valve 3 is opened further so that more material flows into the hopper 1. If the hopper level is too high, the photoelectric cell 9 receives more light from the light source 6, whereupon the valve 3 is moved in the closure direction and throttles the flow of material to the hopper 1.

The hopper 1 narrows down to a small elongated outlet so as to permit the discharge of the material in a thin flat layer 12. An electron beam generator 15 is provided laterally of the layer 12 and includes a deflection system by means of which an electron beam 16 incident perpendicularly with respect to the layer 12 is moved to and fro transversely of the falling direction of the material i.e. over the width of the layer 12. The vertical extent a of the electron beam 16 is preferably many times greater, in the region of the falling material, than the path covered by the material between a complete reciprocation of the electron beam 16, so that the material is irradiated uniformly.

Thus, while the electron beam generator 15 serves as a means for forming a irradiation zone, the hopper 1 serves as a means for directing the flowable material through the irradiation zone in a thin layer under free fall. The term free-fall is the ideal unimpeded falling motion of a body acted upon by the pull of the Earth's gravitational field.

Figure 2:
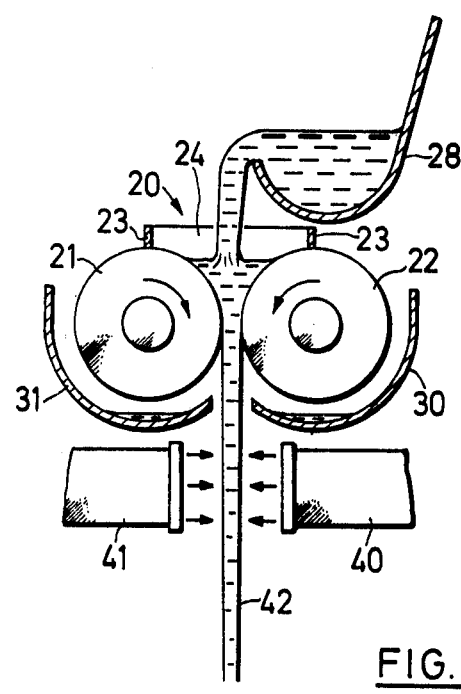
FIG. 2 illustrates a modified apparatus according to the invention.

Referring to FIG. 2, the apparatus for treating a flow of material may also be constructed to meter the flow from a hopper by means of two rollers. The advantage of this is that there is no edge present on which the material and any impurities can build up or clog. To this end, the hopper 20 rests on two rollers 21, 22 which are spaced apart to define a gap to form and discharges a thin layer 42 of the material under free fall. The hopper 20 consists of two walls 23 which extend in parallel relationship to the axes of the rollers 21, 22 and two hexagonal end walls 24. The top edge of these end walls 24 connect the top edge of the walls 23. The top edge of the walls 24 are followed by two short parallel edges connected to the walls 23, the fourth and fifth edges being formed by two concave edges corresponding to the radius of the rollers 21, 22, the bottom ends of these edges being connected by a horizontal edge level with the roller axes and the length corresponding to the spacing between the rollers 21, 22. A feed trough 28 is located above the hopper 20 from which material for irradiation overflows into the hopper 20. Two trays 30, 31 are disposed beneath the rollers 21, 22 and catch any splashes of the material for irradiation and discharge the same laterally. Two electron beam generators 40, 41 are located beneath the trays 30, 31 and their electron beams are directed transversely of the layer 42 of material. The electron beam generators 40, 41 are provided with a deflection system for the beams, so that the beams can be swung at least horizontally over the width of the layer 42 of falling material.

Figure 3:
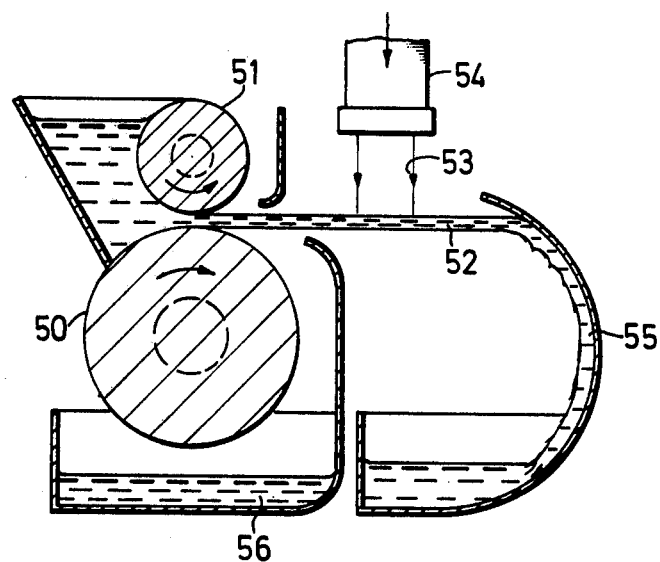
FIG. 3 illustrates another apparatus according to the invention.

Referring to FIG. 3, an apparatus as shown substantially in FIG. 2 may be turned through 90° so that the material fed through the rollers 50, 51 passes through an electron beam 53 of an electron beam source 54 in the form of a substantially horizontal layer 52. The circumferential speed $u$ of the bottom roller 50, which has a radius $r$, is made such that the radial acceleration $u^2/r$ at the circumference of the roller 50 is very much in excess of the acceleration due to gravity, i.e. g = 9.81 m/sec² of free fall. The irradiated material is collected in a tray 55 while splashes of the material are collected in a tray 56.

While the apparatus according to FIG. 1 has the advantage of maximum simplicity, the embodiment according to FIG. 2 has the advantage of good irradiation efficiency with more uniform dose distribution. The arrangement according to FIG. 3 also enables the electron beam generator to be disposed on a vertical axis. This has advantages in construction.

What is claimed is:

1. An apparatus for treating a flowable material comprising a pair of rollers defining a gap therebetween to form a flow of the flowable material passing in free fall from said rollers into a thin vertical layer, said rollers being counter-rotating to accelerate the flow of material in the direction of free fall prior to formation of said thin layer; and at least one electron beam generator for directing an electron beam perpendicularly onto said layer below said rollers to form an irradiation zone, said generator moving said beam horizontally to and fro across said thin layer of falling material.

2. An apparatus as set forth in claim 1 wherein said rollers have a circumferential speed whereby the radial acceleration at the surface of said rollers is greater than the acceleration due to gravity.

3. An apparatus for treating a flowable material comprising a hopper for receiving a flowable material;

a pair of rollers below said hopper, said rollers defining a gap therebetween to form a flow of the flowable material passing in free fall from said rollers into a thin vertical layer, said rollers being counter-rotating to accelerate the flow of material in the direction of free fall prior to formation of said thin layer; and at least one electron beam generator for directing an electron beam perpendicularly onto said layer below said rollers to form an irradiation zone, said generator moving said beam horizontally to and fro across said thin layer of falling material.

* * * * *